United States Patent [19]

Butcher

[11] 4,027,694

[45] June 7, 1977

[54] CONTROL VALVE

[75] Inventor: Alan George Butcher, Bracknell, England

[73] Assignee: Dresser Europe S. A., Brussels, Belgium

[22] Filed: Sept. 30, 1974

[21] Appl. No.: 510,864

[30] Foreign Application Priority Data

Oct. 4, 1973 United Kingdom ............ 46503/73

[52] U.S. Cl. ................................ 137/495; 137/489
[51] Int. Cl.² ...................................... F16K 31/143
[58] Field of Search ................. 251/25, 26, 63, 30, 251/28, 29, 279; 137/489, 495

[56] References Cited

UNITED STATES PATENTS

| 2,117,096 | 5/1938 | Klawitter | 251/25 |
| 2,377,227 | 5/1945 | Griswold | 251/25 |
| 2,841,359 | 7/1958 | Berck | 251/25 |
| 3,101,924 | 8/1963 | Berck | 251/25 |

*Primary Examiner*—Martin P. Schwadron
*Assistant Examiner*—G. L. Walton
*Attorney, Agent, or Firm*—Wenderoth, Lind & Ponack

[57] ABSTRACT

A fluid control valve of the pilot operated kind has a main valve comprising a valve seat and valve member. The valve member is moved by piston action in response to fluid pressure in a control chamber. The control chamber may be coupled to the upstream pressure or the downstream pressure to close or open the valve respectively. When the valve is open there is a bleed of fluid through the control chamber via inlet and outlet passages from the upstream side and to the downstream side of the valve respectively. An auxiliary valve is situated in the downstream passage and effects control of the main valve. The auxiliary valve may be an on/off valve or a continuously controllable valve whereby the operating position of the main valve member may be controlled at an intermediate position automatically to limit flow rate.

4 Claims, 5 Drawing Figures

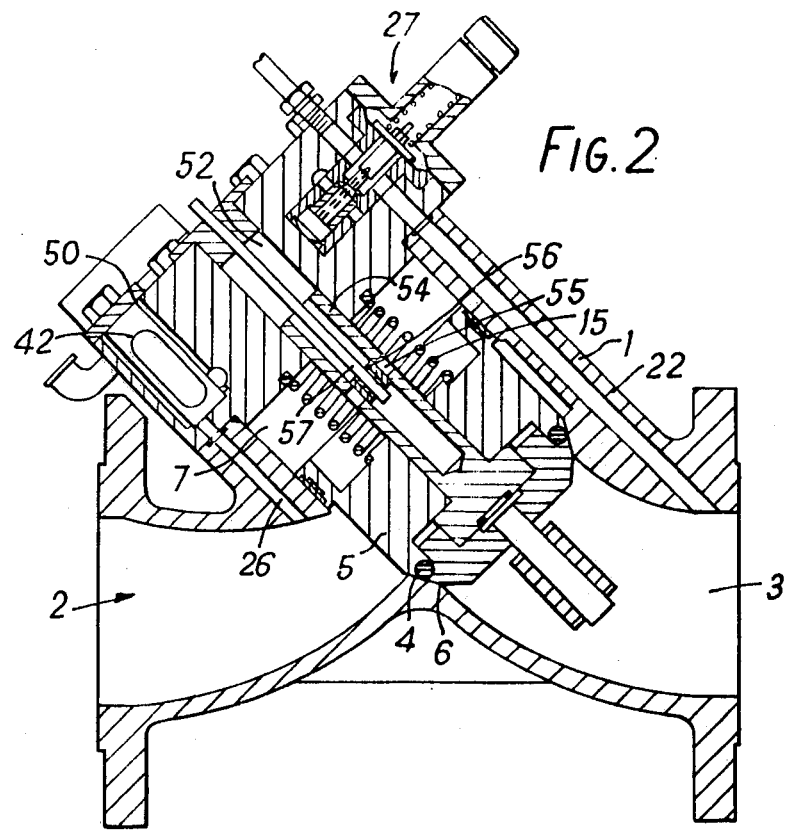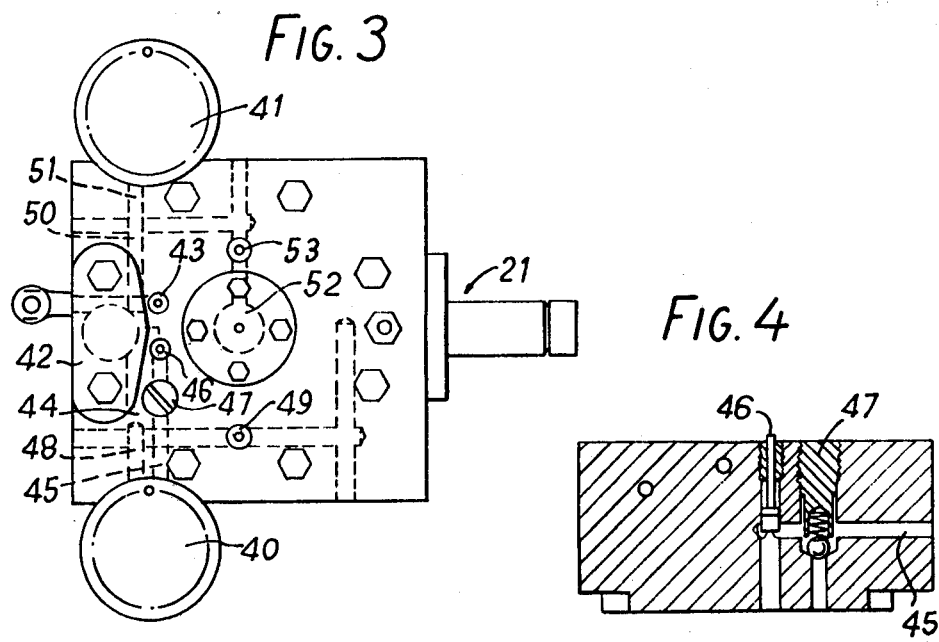

CONTROL VALVE

The invention relates to a control valve for controlling the flow of fluid in a conduit. Particular application for the invention is in controlling the flow of liquid fuel in the bulk loading and unloading of tank trucks and rail cars. In such application, there is a flow meter arranged to measure the flow of the fuel and generally there is a control valve associated with the meter to cut-off the flow when desired. The valve may be controlled by a counter driven by the meter output shaft. Alternatively, it is sometimes desirable to be able to control the valve remotely from a central control point by electric, hydraulic or pneumatic means. It is customary to provide one sort of control valve for preset mechanical operation and another sort of control valve for remote control. Furthermore, it is usually desirable to control the flow rate of the fuel to comply with the maximum handling capacity of the meter. Heretofore, it has been necessary to achieve flow rate control by separate means.

An object of the present invention is to provide an improved fluid control valve.

According to the invention there is provided a control valve of the pilot-operated kind comprising a valve body which includes a main valve seat; a movable main valve cooperating with the main valve seat to open and close the valve; a piston carrying the main valve member; a control chamber behind the piston for exerting fluid pressure thereon; a first passage for coupling the control chamber to the up-stream side of the main valve seat; a second fluid passage for coupling the control chamber to the down-stream side of the main valve seat; both first and second passages being enabled to be open when the main valve is open so that some fluid is by-passed around the main valve via the first and second passages, and at least one auxiliary control valve in the second fluid passage effective to control the flow of fluid therein.

With this arrangement, opening of the auxiliary control valve can be arranged to reduce the pressure in the control chamber substantially to down-stream pressure so that the main valve opens. Closing of the auxiliary control valve can be arranged to increase the pressure in the control chamber to up-stream pressure so that the main valve closes.

The auxiliary valve may be a simple on/off valve. Preferably, however, the auxiliary valve is capable of offering a controlled restriction in the second passage. This allows the pressure in the control chamber to be accurately controlled to maintain the main valve at a required intermediate position. Preferably, the auxiliary valve is controlled by the absolute pressure on the downstream side of the main valve and is so arranged that it controls the main valve to limit the absolute downstream pressure, and thus the flow rate through the main valve, to a predetermined level.

In a preferred embodiment of the invention the control valve is of a mechanically operated kind, there being an additional inlet passage from the up-stream side of the main valve seat to the control chamber and a mechanical pilot valve controllable from outside the housing and effective to control ports which couple the control chamber alternatively to the additional inlet passage and the said second passage. This arrangement allows the control valve to be of a mechanical preset kind in which the mechanical pilot valve is operated by a linkage from a preset counter coupled to a flow meter measuring the flow through the valve. The flow is thus automatically cut off at a preset volume. Additionally, the auxiliary valve in the second passage can be set to limit, in the manner described, the maximum flow rate through the valve. This allows the flow through the meter to be limited to the maximum meter rating.

Another embodiment of the invention provides a remotely controlled valve having many of the components of the mechanical preset valve. However, instead of the mechanical pilot valve, this kind of valve has remote controlled solenoid, pneumatic or hydraulic valves for controlling the inlet pressure to the control chamber in addition to the auxiliary valve. The auxiliary valve of the remotely controlled valve may be the same kind of pressure control valve as described above in relation to the mechanical preset valve.

In a preferred embodiment of the invention, the second passage includes a reservoir chamber, and the auxiliary valve is situated in an outlet of the reservoir chamber and is effective to control the flow from the reservoir chamber to a duct communicating with the downstream side of the valve.

The invention will further be described with reference to the accompanying drawings, of which:

FIG. 2 is a cross-sectional view of a remotely controlled control valve in accordance with the invention;

FIG. 3 is a view of the manifold assembly at 'A' of FIG. 2;

FIG. 4 is a cross-sectional view taken at 'A—A' of FIG. 3; and

Figure 1:
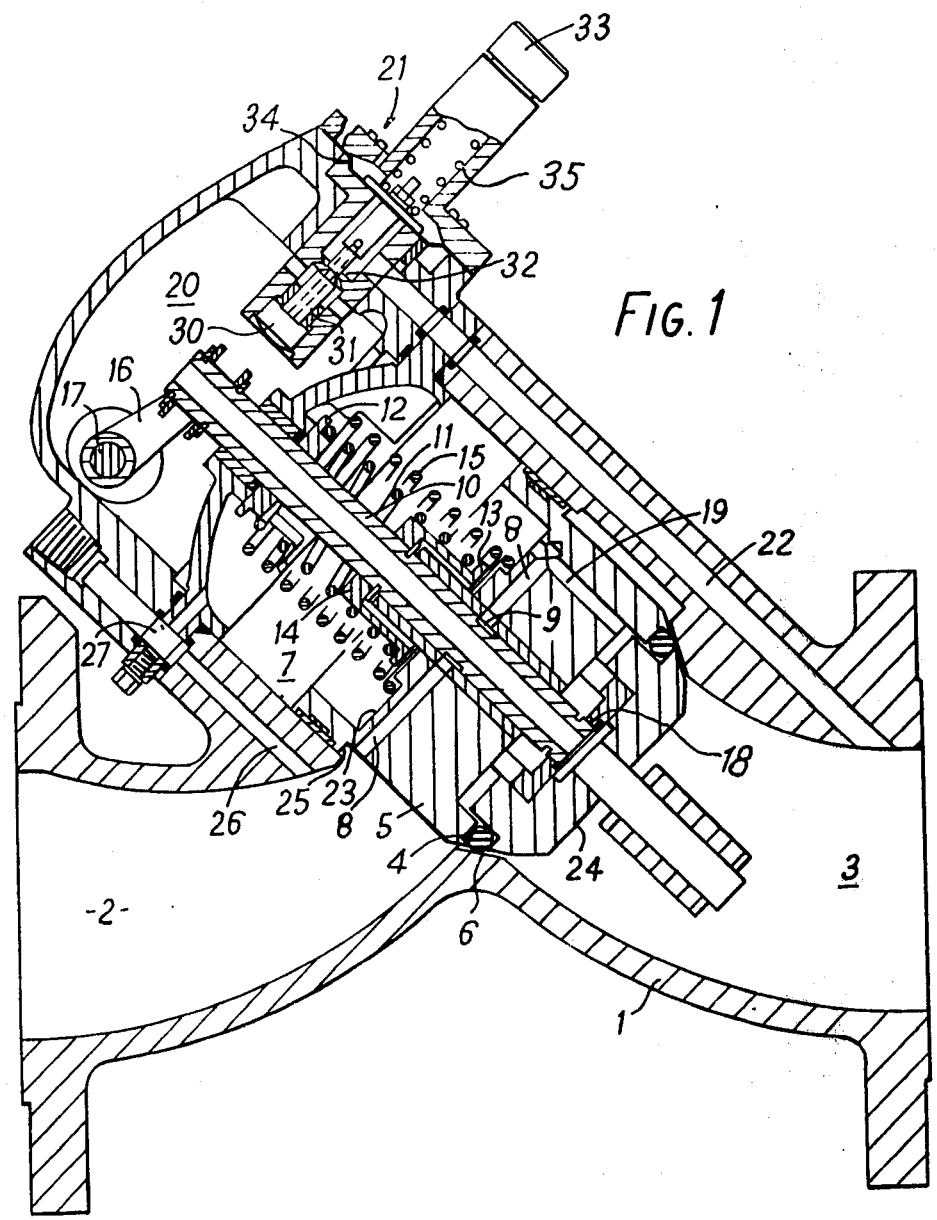
FIG. 1 is a cross-sectional elevation of a mechanical preset type of control valve in accordance with the invention.
Figure 5:
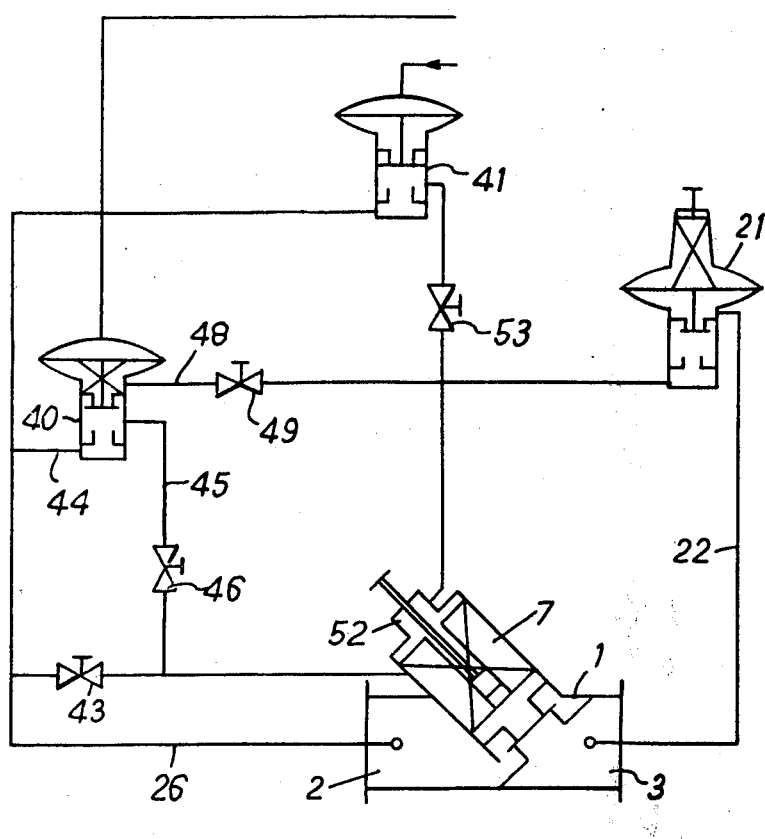
FIG. 5 is a hydraulic circuit diagram of the valve of FIGS. 2 to 4.

Referring to FIG. 1 the valve comprises a housing 1 having an inlet 2 and an outlet 3 for the main fluid flow. A main valve member comprising a rubber sealing ring 4 on a piston 5 co-operates with a main valve seat 6 to open and close the valve. The valve is of the pilot-operated kind, having a control chamber 7 behind the piston and means for controlling the fluid pressure within the chamber 7 to move the piston 5 back and forth. There is a by-pass for fluid around the main valve seat. This comprises a first inlet passage including a duct 26 which leads from the up-stream side of the main valve seat to the control chamber 7 and a second, outlet, passage including a duct 22 which leads from the control chamber 7 to the down-stream side of the main valve seat. Control of the pressure within chamber 7 is effected by regulating the by-pass fluid flowing, in a manner to be described. Additionally, however, there is a mechanical control to open and close the valve. Thus, to close the valve (to the position shown) the control chamber 7 is coupled to the up-stream side of the valve seat 6. This is effected mechanically via an additional inlet passage which comprises a duct 8 in the piston which is opened by a sleeve valve portion 9 on a control rod 10. With the control rod in the position shown, the sleeve valve 9 is open and up-stream pressure is applied to the control chamber 7.

The control rod 10 is slideable within the piston 5 and is normally urged downwardly by a coil spring 11 which presses at one end against a collar 12 fixed in the housing and at the other end against the rim 13 of a cup 14 fixed on the rod 10. A second spring 15 urges the piston 5 normally downwardly by co-operation with the piston at the lower end and with the housing at its upper end.

In order to open the valve, the control rod 10 is withdrawn upwardly by a link 16 which is mounted on a shaft 17 which passes through the wall of the housing and is sealed thereto. This mechanical control is operated externally. In being withdrawn, the control rod 10 closes the sleeve valve 9 and simultaneously opens a valve 18 at the base of the rod. The control rod 10 is hollow and when it is withdrawn the chamber 7 is coupled via a passage 19, valve 18 and the interior of rod 10 to a reservoir chamber 20. The reservoir chamber 20 is coupled via an auxiliary valve 21 to duct 22 which is open at the bottom to the down-stream side of the main valve seat 6.

As was explained above, the action of withdrawing rod 10 is to close the additional passage 8, and opens a second passage which couples the control chamber to the down-stream side of the valve. Thus, the pressure in the control chamber 7 is the down-stream pressure so that the pressure differential between the main faces 23 and 24 of the piston is virtually zero. However, a lip 25 is provided on the piston and the up-stream pressure on this lip produces a net force which urges the piston upwardly to open the valve.

It will be appreciated that closure of the valve from the open position is effected by mechanical movement of the rod 10 downwardly to open the sleeve valve 9 and close valve 18. This produces a differential pressure across the piston which seats the valve member against the valve seat 6. Mechanical control of the shaft 17 is normally effected by a linkage coupled to a preset counter associated with a fluid flow meter which measures the flow through the valve. Thus, flow can be allowed to continue for a certain volume when the counter will reach its preset value and operate the linkage to turn shaft 17 and cut-off the valve. This cut-off is best effected in stages in order to avoid hydraulic shocks in the system. Thus, the mechanical linkage from the preset counter may comprise a cam which is moved to start closure of the valve at a predetermined volume from the present cut-off value so that flow rate is reduced. Final cut-of is then made at the preset value.

When the valve has been opened by mechanical movement of rod 10 it is not entirely accurate to say that the pressure within the control chamber 7 is the same as the down-stream pressure. As was described above, the chamber 7 is open not only to the down-stream duct 22 but also to the up-stream duct 26. Therefore, there is a by-pass leakage flow through duct 26, chamber 7 and duct 22. The pressure within chamber 7 is therefore at some intermediate pressure between the up-stream and downstream pressures. The flow rate through duct 26 is controlled by a preset screw 27 which adjusts a bleed valve in duct 26. Additional control of the by-pass flow rate and therefore of the pressure within chamber 7 is effected by the auxiliary valve 21. It will be seen that if valve 21 is closed the pressure chamber 7 tends to rise to the up-stream pressure and the main valve tends to close. On the other hand, if valve 21 is opened completely the pressure in chamber 7 drops towards the down-stream pressure and the main valve tends to open.

The auxiliary valve 21 is a pressure control valve which responds to the auxiliary pressure in the outlet duct 22, and therefore effectively to the absolute down-stream pressure of the valve. In use, the main valve will be connected in a conduit and there will be further lines and appliances down-stream of the valve. Because of the flow constriction down-stream of the valve, the absolute pressure at the down-stream side of valve seat 6 will be proportional to the flow rate through the valve. If the flow rate increases, then the pressure in duct 22 will increase accordingly. This pressure will be exerted on a diaphragm 34 of the auxiliary valve 21, the other side of the diaphragm 34 being vented to atmosphere. The diaphragm 34 is urged downwardly by a spring 35, the tension of which is adjusted by means of a screw adjustment knob 33. A valve member 31 is coupled with the diaphragm and co-operates with a valve seat 32 so that on being raised the member 31 closes the valve and access between chamber 20 and duct 22 is cut-off. The diaphragm 34 will be moved upwardly by the pressure within duct 22 when that pressure exceeds the preset spring tension. This corresponds to a particular upper desired limit of the flow rate through the valve. When the auxiliary valve 21 is cut off by the flow rate reaching the preset limit value the pressure within chamber 7 will increase and the main valve will start to close. This will reduce the flow rate and the pressure in duct 22 will drop, thereby allowing auxiliary valve 21 to re-open. This reduces the pressure in chamber 7 and tends to raise the main valve again. It will be seen that this arrangement allows flow to continue but not to exceed the preset rate. This preset rate corresponds to the maximum rating of the meter.

By controlling the flow of fluid in duct 22 the operation of the main valve can further be modified by additional auxiliary valves. With appropriate modification of the housing and the duct 22, auxiliary valves may be placed so that the fluid in duct 22 passes through them. Such further auxiliary valves may be operated remotely electrically, hydraulically or pneumatically as desired. It is clear, for example, that if duct 22 is shut-off by another auxiliary valve, then raising the rod 10 of the main valve will not succeed in communicating the control chamber 7 with the down-stream side of the main valve and, therefore, will not cause the main valve to open. However, subsequent release of the auxiliary valve by remote control will then open the main valve.

Referring now to FIGS. 2 to 5 there is shown a remotely controlled valve in accordance with the invention. The valve is similar to that shown in FIG. 1 in that the same body for the housing 1 is employed, the valve being of a pilot-controlled kind having a piston 5 with a sealing ring 4 which co-operates with a main seat 6. The operation of the valve is controlled by the pressure within the control chamber 7 and the piston is urged normally downwardly by spring 15, as in the FIG. 1 arrangement. Also, when the valve is open there is a continuously open by-pass passage which extends from up-stream duct 26 to down-stream duct 22 and which includes the auxiliary pressure control valve 21 which is identical with that of FIG. 1. Thus, when the valve is open the auxiliary valve 21 is able to control the flow rate through the valve in precisely the same manner as is described with reference to FIG. 1.

The difference over the valve of FIG. 1 is that the remotely controlled valve is not operated mechanically but is operated to switch on and off by means of solenoid pilot valves 40 and 41. Duct 26 communicates with an inlet chamber 42 which has an outlet through chamber 7 by way of an adjustable bleed valve 43. Chamber 42 also communicates via a duct 44 to an inlet port of the valve 40. When valve 40 is closed, the aforesaid inlet port is connected to another port which communicates with a duct 45 which leads via an adjustable bleed valve 46 to the chamber 7. A pressure relief valve 47 is also provided. Thus, when valve 40 is closed, upstream pressure is applied to chamber 7 via both the duct including valve 43 and that including valve 46. This ensures that the main valve is closed.

When valve 40 is opened duct 45 is cut off from the inlet duct 44 and instead communicates with an outlet duct 48 from the valve. This duct is immediately beneath duct 44 and communicates via a passage including an adjustable valve 49 to the inlet of the pressure control valve 21. Thus, when valve 40 is open inlet pressure is applied to chamber 7 via valve 43 but the fluid is bled to the outlet (provided valve 21 is open) via conduits 45 and 48. Under these circumstances the main valve is open and it will be seen that there is a continuous by-pass flow around the main valve which is controlled by the auxiliary valve 21 as in the FIG. 1 embodiment.

It will be seen that the arrangement described thus far would allow the main valve to be opened and closed under control of the solenoid-operated pilot valve 40 and while the main valve is open a pressure control can be exerted by the auxiliary valve 21 to adjust the flow rate. However, an additional refinement is provided in the valve of FIGS. 2 to 5 and this is for the purpose of allowing two-stage opening and shutoff of the valve. In order to effect this there is provided a second solenoid-operated valve 41 which has a first port coupled to a duct 50 which communicates with the inlet chamber 42 and a second port which communicates with a duct 51 immediately beneath duct 50. Duct 51 communicates with a chamber 52 via an adjustable bleed valve 53. Thus, when valve 41 is open, inlet pressure is applied to chamber 52. The main piston 5 is provided with an internal sleeve 54 which has ports 55 therein. The sleeve 54 slides on a cylindrical drilled valve member 56 which is mounted on a fixed rod 57 to constitute a sleeve valve. As shown, when the main valve is closed the sleeve valve is closed. However, in opening the main valve the valve 40 is opened to relieve the pressure in chamber 7 by way of ducts 45 and 48. This allows the piston 5 to rise and the ports 55 are thereby partially uncovered. At this time, valve 41 is open and chamber 52 has inlet pressure applied thereto. Thus, when ports 55 are revealed, additional pressure is applied to the interior of control chamber 7 to tend to depress the piston 5. The piston 5 reaches an equilibrium position in which the constriction offered by the sleeve valve 55, 56, is sufficient to balance the pressure relief for chamber 7. When full opening is required the valve 41 is closed so that opening of the sleeve valve relieves the pressure in chamber 52 and the main valve is thereby allowed to open fully.

In closing the valve, an initial signal is applied to valve 41 when it is required to slow down the fuel rate before final cut off. This applies pressure to chamber 52 which depresses the piston 5 to the equilibrium position where the sleeve valve 55, 56, is marginally open. This does not fully close the main valve but cuts down the flow rate. When full closure is required a second signal is sent to valve 40 which changes over to apply inlet pressure to conduit 45 and thus pressurise chamber 7 to close the valve fully. At the same time, valve 40 cuts off the communication between chamber 7 and the outlet via auxiliary valve 21.

It is to be understood that the invention is not limited to the details of the embodiment described above with reference to the drawings. For example, the valves 40 and 41 of the embodiment of FIGS. 2 to 5 may be hydraulic or pneumatic valves instead of electric valves. Such valves would be required to be operated by a small pilot valve driven by the preset mechanism of micro-switches on the preset mechanism for driving the solenoid valves. If hydraulic pressure is used, this would be from the flowing fluid itself and no major changes of parts are required between this system and pneumatic control.

I claim:
1. A pilot-operated fluid control valve comprising:
a valve body having a main flow passage therethrough with a main valve seat therein dividing said flow passage into upstream and downstream portions, said valve body further having a control chamber therein connected by a first passage to said upstream side of said flow passage, and a reservoir chamber separated from said control chamber and connected by a second passage to said downstream side of said flow passage;

main valve means sealed within said control chamber, subject to fluid pressure within said control chamber and movably fitted against said valve seat for seating in said valve seat and separating the upstream and downstream portions in response to pressure in said control chamber, whereby said valve is opened and closed, said main valve means having a third passage therethrough connecting said upstream side of said flow stream to said control chamber;

control rod means fitted through said main valve means and through said third passage therein for moving said main valve means toward and away from said valve set, said control rod means having a longitudinal opening therethrough for forming a fourth passage between said third passage connected to said control chamber and said reservoir chamber;

first control valve means operatively connected to said control rod means and positioned in said third passage for controlling fluid flow through said third passage in response to movement of said control rod means, whereby when said control rod means is positioned to open said main valve means said first control valve means closes said third passage;

second control valve means operatively positioned at the end of said fourth passage through said control rod means adjacent said main valve means for controlling fluid flow through said fourth passage in response to movement of said control rod means, whereby when said main valve means is open said second control valve means is open and fluid entering said control chamber through said first passage may flow from said control chamber to said reservoir chamber through said third and fourth passages and out of said reservoir chamber through said second passage, thereby by-passing around said main valve means when said main valve means is open;

auxiliary control valve means in said second passage for controlling the fluid flow therethrough; and mechanically operated valve means located in said first passage for controlling the amount of fluid flow through said first passage.

2. A valve as claimed in claim 1, wherein said auxiliary control valve is responsive to the pressure in the downstream portion of the flow passage transmitted through said second passage.

3. A valve as claimed in claim 1, wherein said auxiliary control valve is comprised of:
an auxiliary valve body in said second passage and having a valve seat therein;
an auxiliary valve member within said valve body and movably fitted against said auxiliary valve seat for restricting the flow of fluid therethrough;
diaphragm means within said auxiliary valve body, connected to said auxiliary valve member, subject to the downstream pressure in said second passage on the first side thereof connected to said auxiliary valve member and subject to atmospheric pressure on the second side thereof opposite said first side for moving said auxiliary valve member against said valve seat in response to said downstream pressure; and
biasing means positioned against said second side of said diaphragm means for regulating the resistance of said diaphragm to said downstream pressure exerted against said first side, whereby when said downstream pressure forcing against said diaphragm is sufficient to overcome said biasing means said diaphragm means and auxiliary valve member are moved, and said valve member is seated in said valve seat, thereby restricting the fluid flow in said second passage.

4. A valve as claimed in claim 3 wherein said biasing means is comprised of:
a spring biased against said second side of said diaphragm means; and
an adjustable control knob means positioned against said spring for adjusting the biasing force of said spring against said diaphragm means.

* * * * *